United States Patent
Yamanari

(10) Patent No.: US 11,243,066 B2
(45) Date of Patent: Feb. 8, 2022

(54) OPTICAL COHERENCE TOMOGRAPHIC DEVICE COMPRISING DUAL CORRECTION BEAMS OF DIFFERENT PATH LENGTHS

(71) Applicant: Tomey Corporation, Nagoya (JP)

(72) Inventor: Masahiro Yamanari, Nagoya (JP)

(73) Assignee: TOMEY CORPORATION, Nagoya (JP)

(*) Notice: Subject to any disclaimer, the term of this patent is extended or adjusted under 35 U.S.C. 154(b) by 0 days.

(21) Appl. No.: 16/225,656

(22) Filed: Dec. 19, 2018

(65) Prior Publication Data
US 2019/0195614 A1     Jun. 27, 2019

(30) Foreign Application Priority Data
Dec. 22, 2017  (JP) .............................. JP2017-246635

(51) Int. Cl.
*G01B 9/02* (2006.01)

(52) U.S. Cl.
CPC ..... *G01B 9/02071* (2013.01); *G01B 9/02004* (2013.01); *G01B 9/02067* (2013.01);
(Continued)

(58) Field of Classification Search
CPC ............ G01B 9/02071; G01B 9/02069; G01B 9/02072; G01B 9/02004; G01B 9/02067; G01B 9/02091; G01B /
See application file for complete search history.

(56) References Cited

U.S. PATENT DOCUMENTS

| | | | |
|---|---|---|---|
| 9,330,092 B2* | 5/2016 | Vakoc | G01B 9/02028 |
| 9,375,158 B2* | 6/2016 | Vakoc | A61B 5/0073 |

(Continued)

FOREIGN PATENT DOCUMENTS

| | | |
|---|---|---|
| JP | 2010-535093 A | 11/2010 |
| JP | 2016-057197 A | 4/2016 |
| WO | 2009018456 A2 | 2/2009 |

OTHER PUBLICATIONS

Myeong Jin Ju et al. "Advanced multi-contrast Jones matrix optical coherence tomography for Doppler and polarization sensitive imaging", Optics Express, vol. 21, No. 16, p. Aug. 9, 2013, p. 19412 (25 pages total), XP055295780, DOL10.1364/OE.21.019412.

*Primary Examiner* — Hwa Andrew Lee
(74) *Attorney, Agent, or Firm* — Shumaker, Loop & Kendrick, LLP

(57) ABSTRACT

An optical coherence tomographic device may include a light source, a measurement light generator, a reference light generator, an interference light generator, an interference light detector, and a processor. The interference light detector may include a first and second detector that convert interference light to interference signals, a first signal processing unit that samples the interference signal from the first detector, and a second signal processing unit that samples the interference signal from the second detector. Each of the first and second signal processing units may sample the interference signal at a timing from outside. Light generated by the measurement light generator may at least include first and second correction light. The processor may correct a time lag between sampling timings of the first and second signal processing units by using a first and second correction signal converted from the first and second correction light.

2 Claims, 9 Drawing Sheets

(52) U.S. Cl.
CPC ..... *G01B 9/02069* (2013.01); *G01B 9/02072* (2013.04); *G01B 9/02091* (2013.01)

(56) References Cited

U.S. PATENT DOCUMENTS

| | | |
|---|---|---|
| 10,006,754 B2 * | 6/2018 | Gibson .............. G01B 9/02028 |
| 2004/0160611 A1 | 8/2004 | Li |
| 2006/0044566 A1 | 3/2006 | Li |
| 2009/0036782 A1 | 2/2009 | Vakoc et al. |
| 2014/0249407 A1 * | 9/2014 | Adler ...................... A61B 1/07 |
| | | 600/425 |
| 2016/0069664 A1 | 3/2016 | Yamanari |
| 2016/0106319 A1 | 4/2016 | Yasuno et al. |

* cited by examiner

OPTICAL COHERENCE TOMOGRAPHIC DEVICE COMPRISING DUAL CORRECTION BEAMS OF DIFFERENT PATH LENGTHS

CROSS-REFERENCE

This application claims priority to Japanese Patent Application No. 2017-246635, filed on Dec. 22, 2017, the entire contents of which are incorporated herein by reference.

TECHNICAL FIELD

The technique disclosed herein relates to an optical coherence tomographic device comprising a plurality of signal processing units configured to sample interference signals.

BACKGROUND ART

An optical coherence tomographic device provided with a plurality of signal processing units configured to sample interference signals is being developed. Such an optical coherence tomographic device is provided with a plurality of detectors configured to convert interference light to interference signals, and a signal processing unit is provided for each of the plurality of detectors. That is, the optical coherence tomographic device is provided with a plurality of signal processing units. Each of the plurality of detectors is configured to generate an interference signal from interference light. Each of the plurality of signal processing units is configured to sample the interference signal outputted from its corresponding detector among the plurality of detectors. Each of the plurality of signal processing units samples the interference signal at a timing based on a trigger signal inputted from outside. Then, a tomographic image is generated by using the interference signals sampled respectively by the plurality of signal processing units. For example, Japanese Patent Application Publication No. 2016-57197 describes an example of such an optical coherence tomographic device provided with a plurality of signal processing units.

SUMMARY

In this type of optical coherence tomographic device, each of the plurality of signal processing units samples the interference signal at the timing based on the trigger signal inputted from outside. Further, the plurality of signal processing units respectively processes their interference signals, and the tomographic image is generated based on processing results therefrom. Due to this, a correct tomographic image cannot be generated unless the interference signals are sampled respectively in the signal processing units at a correct timing.

However, there is a case where time lag may be generated between timings at which the respective signal processing units acquire the trigger signals due to dimensional errors and the like in an optical system and in electric wirings. In such a case, the interference signals sampled in the plurality of signal processing units are not synchronized, by which a correct tomographic image could not be generated. The disclosure herein discloses a technique that can accurately correct time lag between sampling timings of a plurality of signal processing units.

An optical coherence tomographic device disclosed herein may comprise: a light source; a measurement light generator configured to generate measurement light by using light from the light source, and generate reflected light from a subject by irradiating the subject with the generated measurement light; a reference light generator configured to generate reference light by using the light from the light source; an interference light generator configured to generate interference light by combining the reflected light from the subject generated by the measurement light generator and the reference light generated by the reference light generator; an interference light detector configured to detect interference signals from the interference light generated by the interference light generator; a processor; and a memory storing computer-readable instructions. The interference light detector may comprise a first detector and a second detector configured to convert the interference light to the interference signals; a first signal processing unit configured to sample the interference signal outputted from the first detector, and a second signal processing unit configured to sample the interference signal outputted from the second detector. Each of the first and second signal processing units may be configured to sample the interference signal at a timing that is inputted to the signal processing unit from outside. The reflected light generated by the measurement light generator may at least include first correction light having a first optical path length and second correction light having a second optical path length that is different from the first optical path length. The computer-readable instructions, when executed by the processor, may cause the processor to: generate a tomographic image by using the interference signals sampled respectively by the first and second signal processing units; and correct a time lag between sampling timings of the first and second signal processing units by using a first correction signal converted from the first correction light and a second correction signal converted from the second correction light, the first and second correction signals being included in the interference signals sampled respectively in the first and second signal processing units.

In the above optical coherence tomographic device, the reflected light from the subject generated by the measurement light generator includes the first correction light and the second correction light having the different optical path length from that of the first correction light. Due to this, both of the interference signals sampled respectively in the first and second signal processing units include the first correction signal converted from the first correction light and the second correction signal converted from the second correction light. The processor uses these correction signals to correct time lag between sampling timings of the interference signals respectively sampled in the signal processing units. Due to this, even in a case where there is time lag between the sampling timings in the first signal processing unit and in the second signal processing unit, the sampling timings can be synchronized. Due to this, a correct tomographic image can be generated.

DETAILED DESCRIPTION

Figure 1:
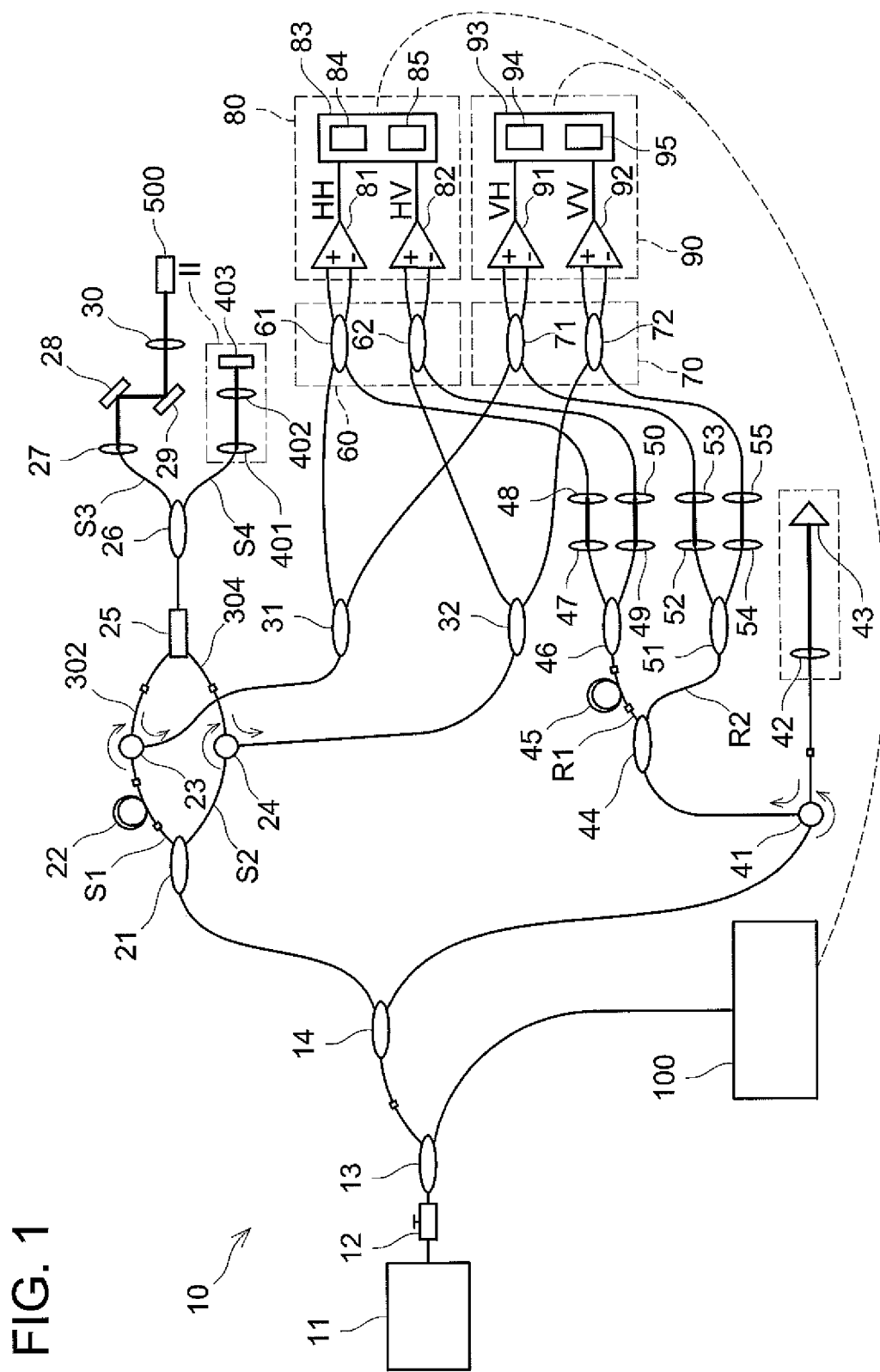
FIG. 1 shows a schematic configuration of an optical system in an optical coherence tomographic device according to an embodiment.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved optical coherence tomographic devices, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Some of the features characteristic to below-described embodiment will herein be listed. It should be noted that the respective technical elements are independent of one another, and are useful solely or in combinations. The combinations thereof are not limited to those described in the claims as originally filed.

(Feature 1) In the optical coherence tomographic device disclosed herein, the measurement light generator may comprise a splitter configured to split an optical path of the measurement light; and an optical path length adjuster disposed on one of optical paths split by the splitter. The measurement light may be generated by light on the other of the optical paths split by the splitter. The first correction light and the second correction light may be generated, and the first and the second optical path lengths respectively of the first and second correction light may be adjusted by the optical path length adjuster. According to such a configuration, an optical path for generating the reflected light from the subject and an optical path for generating the first correction light and the second correction light are split by the splitter. Due to this, the first correction light and the second correction light are generated on the optical path that is different from the optical path for generating the reflected light from the subject, and thus the first correction light and the second correction light can suitably be generated.

(Feature 2) In the optical coherence tomographic device disclosed herein, the optical path length adjuster may comprise an optical element that is disposed on the one of the optical paths split by the splitter, and the optical element may be configured to allow a part of the measurement light to pass through. The measurement light generator may be configured to generate the first correction light by using light that passes through the optical element, and generate the second correction light by using light that does not pass through the optical element. According to such a configuration, by providing the optical element through which a part of the measurement light passes, a plurality of light having different optical path lengths can be generated on the same optical path without increasing a number of split optical paths. Therefore, the first correction light and the second correction light can be generated without increasing a number of components.

(Feature 3) In the optical coherence tomographic device disclosed herein, the optical path length adjuster may comprise an optical element that is disposed on the one of the optical paths split by the splitter, and the optical element may be configured to allow a part of the measurement light to pass through. The measurement light generator may be configured to generate the first correction light by using light that passes through the optical element for a first number of times, and generate the second correction light by using light that passes through the optical element for a second number of times which is different from the first number of times. According to such a configuration as well, a plurality of light having different optical path lengths can be generated on the same optical path, and thus the first correction light and the second correction light can be generated without increasing the number of components.

Embodiment

Hereinafter, an optical coherence tomographic device according to the present embodiment will be described. The optical coherence tomographic device of the present embodiment is a polarization sensitive OCT (so-called PS-OCT) device capable of acquiring a polarization property of a subject, by a Fourier domain method of a wavelength sweeping type using a light source of a wavelength sweeping type (so-called swept-source optical coherence tomography: SS-OCT). The technique disclosed herein is not limited to polarization sensitive OCT, but is also applicable to normal OCT such as fundus OCT or anterior segment OCT. The OCT method is not limited to SS-OCT, but is also applicable to another method using a Fourier domain method, such as spectrum domain OCT (SD-OCT), or a method other than a Fourier domain method (for example, a time domain method).

As shown in FIG. 1, the optical coherence tomographic device of the present embodiment comprises a light source 11; a measurement light generator (21 to 32, 401 to 404) configured to generate measurement light by using light from the light source 11; a reference light generator (41 to 46, 51) configured to generate reference light by using the light from the light source 11; interference light generators 60, 70 each configured to generate interference light by combining the reflected light from a subject 500 generated by the measurement light generator and the reference light generated by the reference light generator, and interference light detectors 80, 90 each configured to detect the interference light generated by the corresponding interference light generator.

(Light Source)

The light source 11 is a light source of a wavelength sweeping type, and the wavelength (wavenumber) of emitted light varies with a predetermined cycle. Since the wavelength of light irradiated to the subject 500 varies (sweeps), a signal obtained from interference light between the reflected light from the subject 500 and the reference light is subjected to Fourier analysis, and thereby an intensity distribution of light reflected from each depthwise portion of the subject 500 can be obtained.

A polarization control device 12 and a fiber coupler 13 are connected to the light source 11, and a PMFC (polarization maintaining fiber coupler) 14 and a sampling trigger/clock generator 100 are connected to the fiber coupler 13. Therefore, light outputted from the light source 11 is inputted, via the polarization control device 12 and the fiber coupler 13, to the PMFC 14 and the sampling trigger/clock generator 100. The sampling trigger/clock generator 100 is configured to generate a sampling trigger and a sampling clock for each of signal processors 83 and 93 to be described later, by using the light from the light source 11.

(Measurement Light Generator)

The measurement light generator (21 to 32, 401 to 404) includes a PMFC 21 connected to the PMFC 14, two measurement light paths S1, S2 that split from the PMFC 21, a polarization beam combiner/splitter 25 that connects the two measurement light paths S1 and S2, an SMFC (single mode fiber coupler) 26 connected to the polarization beam combiner/splitter 25, two measurement light paths S3, S4 split from the SMFC 26, a lens 27, galvanometer mirrors 28, 29, and a lens 30 which are connected to the measurement light path S3, and lenses 401, 402, a mirror 403, and a glass block 404 (see FIG. 2) which are connected to the measurement light path S4. An optical path length difference generator 22 and a circulator 23 are provided on the measurement light path S1. Only a circulator 24 is provided on the measurement light path S2. As such, an optical path length difference ΔL between the measurement light path S1 and the measurement light path S2 is generated by the optical path length difference generator 22. The optical path length difference ΔL may be set longer than a depthwise measurable range of the subject 500. Due to this, interference light having different optical path length differences can be prevented from being overlapped. For the optical path length difference generator 22, for example, an optical fiber may be used or an optical system such as a mirror or a prism may be used. In the present embodiment, a PM fiber with length of 1 m is used as the optical path length difference generator 22. Further, the measurement light generator further includes PMFCs 31, 32. The PMFC 31 is connected to the circulator 23. The PMFC 32 is connected to the circulator 24.

One light (that is, measurement light) split by the PMFC 14 is inputted to the measurement light generator (21 to 32, 401 to 404). The PMFC 21 divides the measurement light inputted from the PMFC 14, into first measurement light and second measurement light. The first measurement light divided by the PMFC 21 is guided to the measurement light path S1, and the second measurement light divided by the PMFC 21 is guided to the measurement light path S2. The first measurement light guided to the measurement light path S1 is inputted, through the optical path length difference generator 22 and the circulator 23, to the polarization beam combiner/splitter 25. The second measurement light guided to the measurement light path S2 is inputted, through the circulator 24, to the polarization beam combiner/splitter 25. A PM fiber 304 is connected to the polarization beam combiner/splitter 25, with the PM fiber 304 rotated by 90 degrees in a circumferential direction relative to a PM fiber 302. Thus, the second measurement light inputted to the polarization beam combiner/splitter 25 has a polarization component orthogonal to that of the first measurement light. Since the optical path length difference generator 22 is provided on the measurement light path S1, the first measurement light is delayed relative to the second measurement light by time corresponding to a distance of the optical path length difference generator 22 (that is, the optical path length difference ΔL is generated). The polarization beam combiner/splitter 25 superimposes the first measurement light and the second measurement light inputted thereto.

The light outputted from the polarization beam combiner/splitter 25 (the light in which the first measurement light and the second measurement light are superimposed) is inputted to the SMFC 26, and the SMFC 26 splits the inputted light to third measurement light and fourth measurement light. The third measurement light split by the SMFC 26 is guided to the measurement light path S3, and the fourth measurement light split by the SMFC 26 is guided to the measurement light path S4. The third measurement light guided to the measurement light path S3 is irradiated to the subject 500 through the lens 27, the galvanometer mirrors 28, 29, and the lens 30. The light irradiated to the subject 500 is scanned in x-y directions by the galvanometer mirrors 28, 29. The light irradiated to the subject 500 reflects on a surface of and within the subject 500. The reflected light from the subject 500 is inputted to the SMFC 26 through the lens 30, galvanometer mirrors 29, 28, and the lens 27, in a reverse direction from the incident path, and is inputted to the polarization beam combiner/splitter 25.

Figure 2:
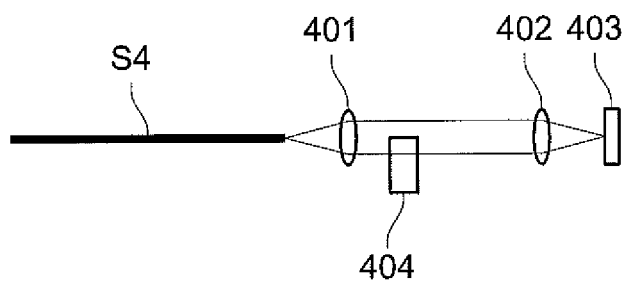
FIG. 2 shows an enlarged view of a primary part II of FIG. 1.

As shown in FIG. 2, the fourth measurement light guided to the measurement light path S4 is irradiated to the lens 401. The glass block 404 is provided between the lenses 401, 402. The glass block 404 is disposed to allow a part of the fourth measurement light irradiated from the lens 401 to pass through. For example, in FIG. 2, the glass block 404 is disposed to allow substantially a lower half of the fourth measurement light irradiated from the lens 401 to pass through and not to allow substantially an upper half thereof to pass through. Due to this, a part of the fourth measurement light irradiated from the lens 401 (which is the light passing a lower side of the lens 401 in FIG. 2) passes through the glass block 404, and is irradiated to the mirror 403 through the lens 402. On the other hand, a remaining part of the fourth measurement light irradiated from the lens 401 (which is the light passing an upper side of the lens 401 in FIG. 2) does not pass through the glass block 404, and is irradiated to the mirror 403 through the lens 402. Reflected light from the mirror 403 passes through the lens 402, and a part thereof passes through the glass block 404 and is irradiated to the lens 401, while its remaining part is irradiated to the lens 401 without passing through the glass block 404. Then, they are inputted to the SMFC 26 through the lens 401. As such, the light having passed through the glass block 404 and the light not having passed through the glass block 404 are both inputted to the SMFC 26. The light having passed through the glass block 404 may be light that has passed through the glass block 404 once (that is, light that has passed through the glass block 404 on only one of its outgoing path or returning path upon reciprocating between the lenses 401, 402), may be light that has passed through the glass block 404 twice (that is, light that has passed through the glass block 404 on both the outgoing path and returning path upon reciprocating between the lenses 401, 402), or may be both of such light. The mirror 403 and the glass block 404 are disposed so that the measurement light that has passed through the measurement light path S4 is measured around a Nyquist frequency in a measurement range. The light inputted to the SMFC 26 is inputted to the polarization beam combiner/splitter 25.

The reflected light from the subject 500 and the reflected light from the mirror 403 that were inputted to the polarization beam combiner/splitter 25 are divided in the polarization beam combiner/splitter 25 into two polarization components that perpendicularly intersect each other. For the sake of convenience of explanation, they will herein be termed horizontal polarization reflected light (horizontal polarization component) and vertical polarization reflected light (vertical polarization component). Then, the horizontal polarization reflected light is guided to the measurement light path S1 and the vertical polarization reflected light is guided to the measurement light path S2. The horizontal polarization reflected light has its optical path changed by the circulator 23, and is inputted to the PMFC 31. The PMFC 31 splits the inputted horizontal polarization reflected light and inputs the split light to each of PMFCs 61, 71. Thus, the horizontal polarization reflected light inputted to the PMFCs 61, 71 includes the reflected light component from the first measurement light and the reflected light component from the second measurement light. The vertical polarization reflected light has its optical path changed by the circulator 24, and is inputted to the PMFC 32. The PMFC 32 splits the inputted vertical polarization reflected light and inputs the split light to each of PMFCs 62, 72. Thus, the vertical polarization reflected light inputted to the PMFCs 62, 72 includes the reflected light component from the first measurement light and the reflected light component from the second measurement light.

(Reference Light Generator)

The reference light generator (41 to 46, 51) includes a circulator 41 connected to the PMFC 14; a reference delay line (42, 43) connected to the circulator 41; a PMFC 44 connected to the circulator 41: two reference light paths R1 and R2 split from the PMFC 44; a PMFC 46 connected to the reference light path R1: and a PMFC 51 connected to the reference light path R2. An optical path length difference generator 45 is provided on the reference light path R1. No optical path length difference generator is provided on the reference light path R2. Therefore, an optical path length difference ΔL' between the reference light path R1 and the reference light path R2 is generated by the optical path length difference generator 45. For example, an optical fiber is used for the optical path length difference generator 45. The optical path length difference ΔL' of the optical path length difference generator 45 may be the same as the optical path length difference ΔL of the optical path length difference generator 22. If the optical path length differences ΔL and ΔL' are the same, depthwise positions of a plurality of interference light described later in the subject 500 coincide with each other. That is, it becomes unnecessary to perform position adjustment among a plurality of acquired tomographic images.

The other light split by the PMFC 14 (that is, the reference light) is inputted to the above reference light generator (41 to 46, 51). The reference light inputted from the PMFC 14 is inputted to the reference delay line (42, 43) through the circulator 41. The reference delay line (42, 43) include a collimator lens 42 and a reference mirror 43. The reference light inputted to the reference delay line (42, 43) is irradiated to the reference mirror 43 through the collimator lens 42. The reference light reflected on the reference mirror 43 is inputted to the circulator 41 through the collimator lens 42. Here, the reference mirror 43 is configured capable of moving in directions to approach towards and separate from the collimator lens 42. In the present embodiment, a position of the reference mirror 43 is adjusted before start of measurement so that a signal from the subject 500 will be within the depthwise measurable range of the OCT.

The reference light reflected by the reference mirror 43 has its optical path changed by the circulator 41, and is inputted to the PMFC 44. The PMFC 44 splits the inputted reference light into first reference light and second reference light. The first reference light is guided to the reference light path R1, and the second reference light is guided to the reference light path R2. The first reference light is inputted, through the optical path length difference generator 45, to the PMFC 46. The reference light inputted to the PMFC 46 is split into first split reference light and second split reference light. The first split reference light is inputted, through a collimator lens 47 and a lens 48, to the PMFC 61. The second split reference light is inputted, through a collimator lens 49 and a lens 50, to the PMFC 62. The second reference light is inputted to the PMFC 51, and is split into third split reference light and fourth split reference light. The third split reference light is inputted, through a collimator lens 52 and a lens 53, to the PMFC 71. The fourth split reference light is inputted, through a collimator lens 54 and a lens 55, to the PMFC 72.

(Interference Light Generator)

The interference light generators 60, 70 include a first interference light generator 60 and a second interference light generator 70. The first interference light generator 60 includes the PMFC 61 and 62. As described above, the PMFC 61 receives the horizontal polarization reflected light from the measurement light generator, and receives the first split reference light (light having the optical path length difference ΔL) from the reference light generator. Here, the horizontal polarization reflected light contains the reflected light component (light having the optical path length difference ΔL) from the first measurement light, and the reflected light component (light not having the optical path length difference ΔL) based on the second measurement light. Therefore, in the PMFC 61, of the horizontal polarization reflected light, the reflected light component (light having the optical path length difference ΔL) based on the first measurement light and the first split reference light are combined, by which first interference light (horizontal polarization component) is generated.

The PMFC 62 receives the vertical polarization reflected light from the measurement light generator, and receives the second split reference light (light having the optical path length difference ΔL') from the reference light generator. Here, the vertical polarization reflected light contains the reflected light component (light having the optical path length difference ΔL) based on the first measurement light, and the reflected light component (light not having the optical path length difference ΔL) based on the second measurement light. Therefore, in the PMFC 62, of the vertical polarization reflected light, the reflected light component (light having the optical path length difference ΔL) based on the first measurement light and the second split reference light are combined, by which second interference light (vertical polarization component) is generated.

The second interference light generator 70 includes the PMFC 71 and 72. As described above, the PMFC 71 receives the horizontal polarization reflected light from the measurement light generator, and receives the third split reference light (light not having the optical path length difference ΔL') from the reference light generator. Therefore, in the PMFC 71, of the horizontal polarization reflected light, the reflected light component (light not having the optical path length difference ΔL) based on the second measurement light and the third split reference light are combined, by which third interference light (horizontal polarization component) is generated.

The PMFC 72 receives the vertical polarization reflected light from the measurement light generator, and receives the fourth split reference light (light not having the optical path length difference ΔL') from the reference light generator. Therefore, in the PMFC 72, of the vertical polarization reflected light, the reflected light component (light not having the optical path length difference ΔL) based on the second measurement light and the fourth split reference light are combined, by which fourth interference light (vertical polarization component) is generated. The first interference light and the second interference light correspond to the measurement light that has passed through the measurement light path S1, and the third interference light and the fourth interference light correspond to the measurement light that has passed through the measurement light path S2.

(Interference Light Detectors)

The interference light detectors 80, 90 include a first interference light detector 80 configured to detect the interference light (the first interference light and the second interference light) generated in the first interference light generator 60, and a second interference light detector 90 configured to detect the interference light (the third interference light and the fourth interference light) generated in the second interference light generator 70.

The first interference light detector 80 includes balanced light detectors 81 and 82 (which may simply be termed detectors 81, 82 hereinbelow), and the signal processor 83 connected to the detectors 81 and 82. The PMFC 61 is connected to the detector 81, and the signal processor 83 is connected to an output terminal of the detector 81. The PMFC 61 splits the first interference light into two interference light having phases different from each other by 180 degrees, and inputs the two interference light to the detector 81. The detector 81 performs differential amplification processing and noise reduction processing for the two interference light having phases different from each other by 180 degrees inputted from the PMFC 61 so as to convert them to an electric signal (first interference signal), and outputs the first interference signal to the signal processor 83. That is, the first interference signal is an interference signal HH between the horizontal polarization reflected light from the subject 500 and the mirror 403 based on the horizontal polarization measurement light, and the reference light. Similarly, the PMFC 62 is connected to the detector 82, and the signal processor 83 is connected to an output terminal of the detector 82. The PMFC 62 splits the second interference light into two interference light having phases different from each other by 180 degrees, and inputs the two interference light to the detector 82. The detector 82 performs differential amplification processing and noise reduction processing for the two interference light having phases different from each other by 180 degrees so as to converted them to an electric signal (second interference signal), and outputs the second interference signal to the signal processor 83. That is, the second interference signal is an interference signal HV between the vertical polarization reflected light from the subject 500 and the mirror 403 based on the horizontal polarization measurement light, and the reference light.

The signal processor 83 includes a first signal processing unit 84 to which the first interference signal is inputted, and a second signal processing unit 85 to which the second interference signal is inputted. The first signal processing unit 84 is configured to sample the first interference signal based on the sampling trigger and the sampling clock inputted to the signal processor 83 from the sampling trigger/clock generator 100. Further, the second signal processing unit 85 is configured to sample the second interference signal based on the sampling trigger and the sampling clock inputted to the signal processor 83 from the sampling trigger/clock generator 100. The first and second interference signals sampled in the first signal processing unit 84 and the second signal processing unit 85 are inputted to a processor 202 to be described later. A known data acquisition device (a so-called DAQ) may be used as the signal processor 83.

The second interference light detector 90, similarly to the first interference light detector 80, includes balanced light detectors 91 and 92 (which may simply be termed detectors 91, 92 hereinbelow), and the signal processor 93 connected to the detectors 91 and 92. The PMFC 71 is connected to the detector 91, and the signal processor 93 is connected to an output terminal of the detector 91. The PMFC 71 splits the third interference light into two interference light having phases different from each other by 180 degrees, and inputs the two interference light to the detector 91. The detector 91 performs differential amplification processing and noise reduction processing for the two interference light having phases different from each other by 180 degrees so as to convert them to an electric signal (third interference signal), and outputs the third interference signal to the signal processor 93. That is, the third interference signal is an interference signal VH between the horizontal polarization reflected light from the subject 500 and the mirror 403 based on the vertical polarization measurement light, and the reference light. Similarly, the PMFC 72 is connected to the detector 92, and the signal processor 93 is connected to an output terminal of the detector 92. The PMFC 72 splits the fourth interference light into two interference light having phases different from each other by 180 degrees, and inputs the two interference light to the detector 92. The detector 92 performs differential amplification processing and noise reduction processing for the two interference light having phases different from each other by 180 degrees so as to convert them to an electric signal (fourth interference signal), and outputs the fourth interference signal to the signal processor 93. That is, the fburth interference signal is an interference signal VV between the vertical polarization reflected light from the subject 500 and the mirror 403 based on the vertical polarization measurement light, and the reference light.

The signal processor 93 includes a third signal processing unit 94 to which the third interference signal is inputted, and a fourth signal processing unit 95 to which the fourth interference signal is inputted. The third signal processing unit 94 is configured to sample the third interference signal based on the sampling trigger and the sampling clock inputted to the signal processor 93 from the sampling trigger/clock generator 100. Further, the fourth signal processing unit 95 is configured to sample the fourth interference signal based on the sampling trigger and the sampling clock inputted to the signal processor 93 from the sampling trigger/clock generator 100. The third and fourth interference signals sampled in the third signal processing unit 94 and the fourth signal processing unit 95 are inputted to the processor 202 to be described later. A known data acquisition device (a so-called DAQ) may also be used as the signal processor 93. According to such a configuration, the interference signals indicating four polarization characteristics of the subject 500 can be acquired. In the present embodiment, the signal processors 83, 93 that are each provided with two signal processing units, however, no limitation is placed to this configuration. For example, one signal processor provided with four signal processing units may be used, or four signal processors each including one signal processing unit may be used.

Figure 3:
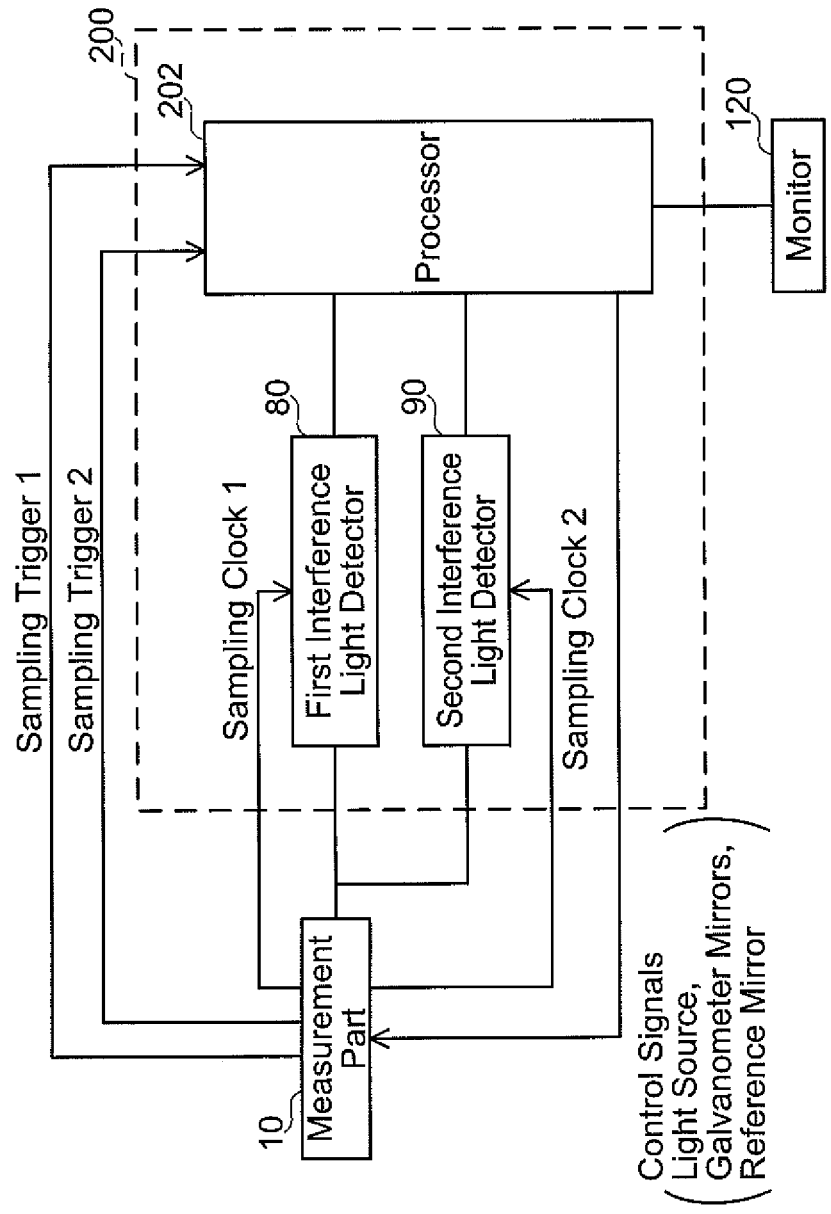
FIG. 3 is a block diagram showing a control system of the optical coherence tomographic device according to the embodiment.

Next, the configuration of a control system of the optical coherence tomographic device according to the present embodiment will be described. As shown in FIG. 3, the optical coherence tomographic device is controlled by a calculation unit 200. The calculation unit 200 includes the processor 202, the first interference light detector 80, and the second interference light detector 90. The first interference light detector 80, the second interference light detector 90, and the processor 202 are connected to a measurement part 10. The processor 202 is configured to output a control signal to the measurement part 10 to drive the galvanometer mirrors 28 and 29, thereby moving an incidence position of the measurement light to the subject 500. The first interference light detector 80 is configured to acquire first sampling data with respect to the interference signals (the interference signal HH and the interference signal HV) inputted from the measurement part 10, based on a sampling clock 1 inputted from the measurement part 10 and by using a sampling trigger 1 as a trigger, and output the first sampling data to the processor 202. The processor 202 performs calculation processing such as Fourier transform processing on the first sampling data to generate an HH tomographic image and an HV tomographic image. The second interference light detector 90 is configured to acquire second sampling data with respect to the interference signals (the interference signal VH and the interference signal VV) inputted from the measurement part 10, based on a sampling clock 2 inputted from the measurement part 10 and by using a sampling trigger 2 as a trigger, and output the second sampling data to the processor 202. The processor 202 performs calculation processing such as Fourier transform processing on the second sampling data to generate a VH tomographic image and a VV tomographic image. Here, the HH tomographic image, the VH tomographic image, the HV tomographic image, and the VV tomographic image are tomographic images at a same position. Therefore, the processor 202 can generate tomographic images of four polarization properties (HH, HV, VH, VV) representing a Jones matrix of the subject 500.

Figure 4:
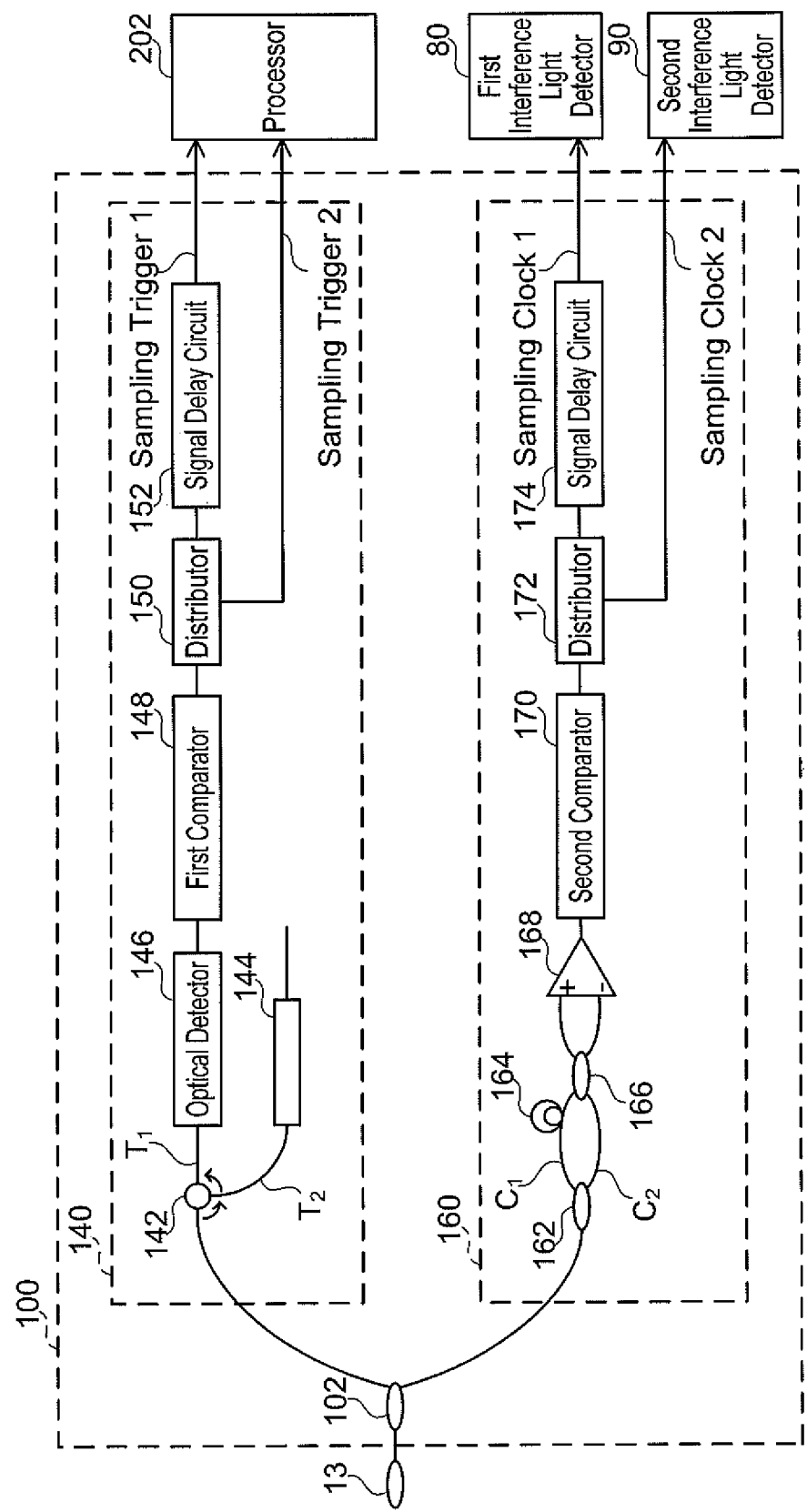
FIG. 4 is a block diagram showing a configuration of a sampling trigger/clock generator.

As shown in FIG. 4, the sampling trigger/clock generator 100 includes a fiber coupler 102, a sampling trigger generator (140 to 152), and a sampling clock generator (160 to 174). Light from the light source 11 is inputted, via the fiber coupler 13 and the fiber coupler 102, to each of the sampling trigger generator 140 and the sampling clock generator 160.

(Sampling Trigger Generator)

The sampling trigger generator 140 may generate a sampling trigger by using, for example, an FBG (Fiber Bragg Grating) 144. As shown in FIG. 4, the FBG 144 reflects only a component having a specific wavelength of the light inputted from the light source 11, thereby generating a sampling trigger. The generated sampling trigger is inputted to a distributor 150. The distributor 150 distributes the sampling trigger into the sampling trigger 1 and the sampling 26 trigger 2. The sampling trigger 1 is inputted, via a signal delay circuit 152, to the processor 202. The sampling trigger 2 is directly inputted to the processor 202. The sampling trigger 1 is a trigger signal for the interference signals (the first interference signal and the second interference signal) inputted from the first interference light detector 80 to the processor 202. The sampling trigger 2 is a trigger signal for the interference signals (the third interference signal and the fourth interference signal) inputted from the second interference light detector 90 to the processor 202. The signal delay circuit 152 is designed so that the sampling trigger 1 is delayed relative to the sampling trigger 2 by a time corresponding to the optical path length difference ΔL of the optical path length difference generator 22. Thus, frequency at which sampling of the interference signals inputted from the first interference light detector 80 is started and frequency at which sampling of the interference signals inputted from the second interference light detector 90 is started can be made same. Here, only the sampling trigger 1 may be generated. Since the optical path length difference ΔL is already known, upon sampling the interference signals inputted from the second interference light detector 90, the sampling may be started with a delay from the sampling trigger 1 by a time corresponding to the optical path length difference ΔL.

(Sampling Clock Generator)

The sampling clock generator may be constituted of a Mach-Zehnder interferometer, for example. As shown in FIG. 4, the sampling clock generator generates a sampling clock with an equal frequency, by using the Mach-Zehnder interferometer. The sampling clock generated by the Mach-Zehnder interferometer is inputted to a distributor 172. The distributor 172 distributes the sampling clock into the sampling clock 1 and the sampling clock 2. The sampling clock 1 is inputted, through a signal delay circuit 174, to the first interference light detector 80. The sampling clock 2 is directly inputted to the second interference light detector 90. The signal delay circuit 174 is designed so as to cause a delay by a time corresponding to the optical path length difference ΔL of the optical path length difference generator 22. Thus, the interference light with the delay corresponding to the optical path length difference generator 22 can also be sampled at a same timing. Thus, the positions of a plurality of acquired tomographic images can be prevented from being misaligned from each other. In the present embodiment, a Mach-Zehnder interferometer is used for generating the sampling clocks. Alternatively, for generating the sampling clocks, a Michelson interferometer may be used or an electric circuit may be used. Alternatively, the sampling clocks may be generated by using a light source having a sampling clock generator.

Next, a process of correcting time lag between sampling timings generated among the four signal processing units 84, 85, 94, 95 will be described. As described above, the trigger signals are respectively inputted to the interference light detectors 80, 90 so that the four signal processing units 84, 85, 94, 95 start sampling in synchrony. However, time lag may be generated between timings at which the trigger signals reach the respective four signal processing units 84, 85, 94, 95 due to an error or the like in the sampling trigger/clock generator 100. Further, since the four interference light inputted to the interference light detectors 80, 90 are respectively generated by different interferometers, manufacture errors will be generated in optical path lengths of those interferometers. Due to this, time lag is generated between the sampling timings of the four signal processing units 84, 85, 94, 95. To correct such time lag between the sampling timings, the processor 202 performs the process as below.

Figure 5:
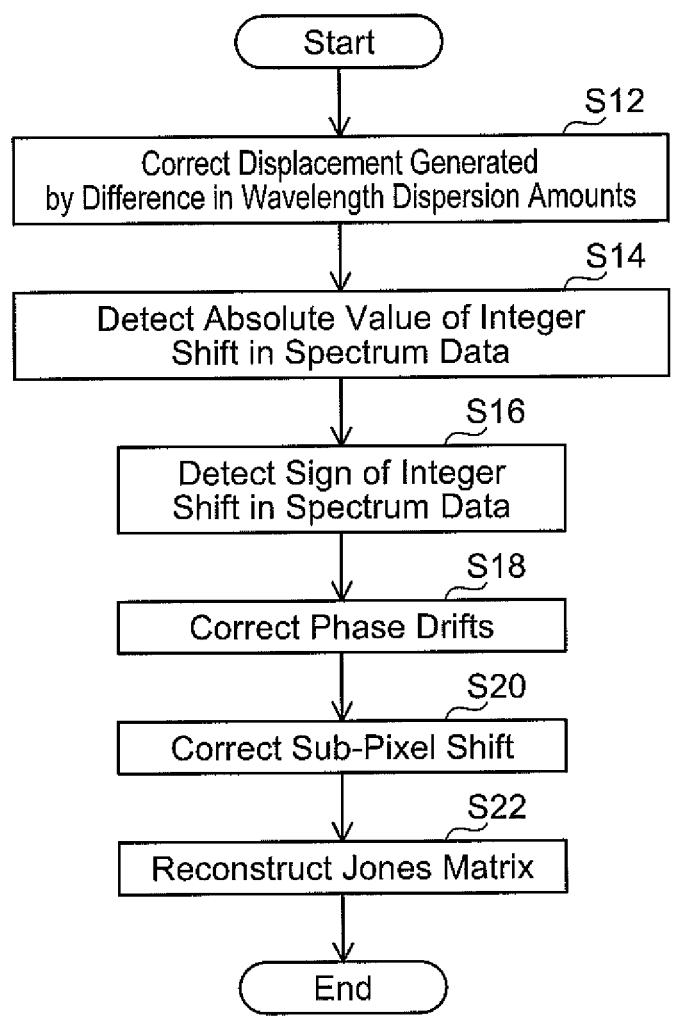
FIG. 5 is a flowchart showing an example of a process to correct time lag between sampling timings in a plurality of signal processing units.

As shown in FIG. 5, as a preparation process, the processor 202 firstly corrects a displacement generated by a difference in wavelength dispersion amounts of the light inputted to the interference light detectors 80, 90 (S12). As aforementioned, the respective interference light inputted to the detectors 81, 82, 91, 92 are generated by the interferometers that are independently arranged in parallel, and thus the optical path lengths (such as fiber lengths) differ in the respective interferometers. Due to this, a difference is generated in the wavelength dispersion amounts of the respective interference light inputted to the detectors 81, 82, 91, 92. This difference is corrected by using light reflected on the mirror 403 (hereinbelow may be termed correction light).

Step S12 is performed according to a procedure below. Hereinbelow, the first signal processing unit 84, the second signal processing unit 85, the third signal processing unit 94, and the fourth signal processing unit 95 are denoted as $j^{th}$ signal processing unit (j=1 to 4), and it is assumed that the interference signal sampled in each of the signal processing units 84, 85, 94, 95 becomes 1 to $n_{all}$ interference signals along a depth direction after the sampling.

Firstly, the processor 202 extracts an $n^{th}$ interference signal, which is one of interference signals of the correction light, from among the interference signals sampled in the $j^{th}$ signal processing unit by a window function. A complex spectrum signal of the correction light that is obtained by subjecting the extracted interference signal to inverse Fourier transform is shown in Math 1 below. Here, k indicates a wave number.

$$E_{j\_mirror}(k,n) \qquad \text{[Math 1]}$$

Calculating the complex spectrum signal of the correction light by using Math 2 below can effectively reduce noise in the complex spectrum signal of the correction light. Here, i is an imaginary unit.

$$E'_{j\_mirror}(k) = \frac{1}{n_{all}} \sum_{n=1}^{n_{all}} E_{j\_mirror}(k,n) \exp[-i(\arg(E_{1\_mirror}(k,n)))] \qquad \text{[Math 2]}$$

A phase component of Math 2 above is shown in Math 3 below.

$$\arg(E_{j\_mirror}'(k)) \qquad \text{[Math 3]}$$

The processor 202 performs phase unwrapping on the phase component shown by Math 3 and performs polynomial fitting thereon. The degree of the polynomial fitting may be any degree, however, it may be in quadratic, for example. Due to this, the phase noise is efficiently reduced in the complex spectrum signal. Here, a phase obtained by this fitting is shown below in Math 4.

$$\theta_j(k) \qquad \text{[Math 4]}$$

Here, $n^{th}$ complex spectrum signal sampled in the $j^{th}$ signal processing unit is corrected as below.

$$E_j'(k,n) = E_j(k,n) e^{-i\theta_j(k)} \qquad \text{[Math 5]}$$

Further, by subjecting Math 5 to Fourier transform, an A-scan signal of $n^h$ complex is calculated (Math 6 below).

An A-scan indicates a distribution of a depthwise signal intensity, and z indicates a depthwise position.

$$E_j'(z,n) = \mathcal{F}\{E_j'(k,n)\} \qquad \text{[Math 6]}$$

Next, the processor 202 detects an absolute value of an integer shift in spectrum data 16 (S14). The sampling timings in the signal processing units 84, 85, 94, 95 are determined by the trigger signals. That is, each of the signal processing units 84, 85, 94, 95 starts sampling based on corresponding one of the trigger signals inputted to the interference light detectors 80, 90. As aforementioned, there are cases where time lag is generated between the timings at which the trigger signals are inputted to the respective signal processors 83, 93. Further, there are cases where time lag is generated between the timings of arrival of the trigger signals among the plurality of signal processing units provided in one signal processor (for example, among the signal processing units 84, 85 provided in the signal processor 83 and/or the signal processing units 94, 95 provided in the signal processor 93). Time lag generated in such cases is small, and specifically, the sampling timings are lagged by one pixel. Such a displacement (hereinbelow may be termed an integer shift in the spectrum data) is corrected by using the correction light.

Step S14 is performed according to a procedure below. Firstly, as a temporary variant for calculation in step S14, the $n^{th}$ A-scan signal is defined as in Math 7 below.

$$\varepsilon_j'(z,n) = E_j'(z,n) \qquad \text{[Math 7]}$$

Further, a phase shift that is caused as a result of the measured spectrum data having shifted by an integral multiple of sampling is expressed by Math 8 below, and a relative phase fluctuation caused by fluctuation in the interferometer is expressed by Math 9 below.

$$\eta_j(z, \Delta_{n,n+1}) \qquad \text{[Math 8]}$$

$$\varphi_j(\Delta_{n,n+1}) \qquad \text{[Math 9]}$$

In so doing, a signal phase difference between the $n^{th}$ A-scan signal and an $n+1^{th}$ A-scan signal is expressed by Math 10 below.

$$\arg(\varepsilon_j'(z,n+1)\varepsilon_j'^*(z,n)) = \eta_j(z, \Delta_{n,n+1}) + \varphi_j(\Delta_{n,n+1}) \qquad \text{[Math 10]}$$

Here, the A-scan signal includes a displacement other than the integer shift in the spectrum data, and for example, different phase drifts are generated in the data sampled in the respective signal processing units 84, 85, 94, 95. Since a detection time difference is small between the $n^{th}$ A-scan signal and the $n+1^{th}$ A-scan signal, an influence of the phase drift is small. Due to this, if there is a signal phase difference between the $n^{th}$ A-scan signal and the $n+1^{th}$ A-scan signal, this phase difference is thought to be caused not by the influence of the phase drift, but by the influence of the integer shift in the spectrum data. As such, a determination can be made on whether or not such an integer shift in the spectrum data is present by using Math 10.

Here, the depthwise position of the correction light is denoted by $z_{m1}$, and the depthwise position corresponding to the Nyquist frequency is denoted by $z_{max}$. In a case where the spectrum data of the measured A-scan signal is displaced by +1 pixel or by −1 pixel, the processor 202 can calculate the phase shift amount of the A-scan signal at the position $z_{m1}$ by using Math 11 below according to the shifting rule of Fourier transform.

$$\eta_{theory}(z_{m1}) = \pm \frac{z_{m1}}{z_{max}}\pi \quad \text{[Math 11]}$$

Thus, by monitoring Math 11 above, a determination can be made on whether or not the spectrum data of the A-scan signal is displaced by one pixel.

Next the phase shift amount between the measured $n^{th}$ A-scan signal and the $n+1^{th}$ A-scan signal at the position $z_{m1}$ is expressed in Math 12 below.

$$\eta_j(z_{m1}, \Delta_{n,n+1}) \quad \text{[Math 12]}$$

The processor 202 replaces the $n+1^{th}$ A-scan signal as in Math 13 below in accordance with a value of the phase shift amount shown in Math 12.

$$\varepsilon'_j(z, n+1) \to \begin{cases} \varepsilon'_j(z, n+1)\exp(-i|\eta_{theory}(z_{m1})|) & \left(\eta_j(z_{m1}, \Delta_{n,n+1}) \geq \frac{|\eta_{theory}(z_{m1})|}{2}\right) \\ \varepsilon'_j(z, n+1) & \left(|\eta_j(z_{m1}, \Delta_{n,n+1})| < \frac{|\eta_{theory}(z_{m1})|}{2}\right) \\ \varepsilon'_j(z, n+1)\exp(+i|\eta_{theory}(z_{m1})|) & \left(\eta_j(z_{m1}, \Delta_{n,n+1}) \leq -\frac{|\eta_{theory}(z_{m1})|}{2}\right) \end{cases} \quad \text{[Math 13]}$$

The processor 202 performs calculation similarly for the $n+1^{th}$ A-scan signal and an $n+2^{th}$ A-scan signal by using Math 13 above. As such, by repeating the above calculation starting from n=1, all of the A-scan signals can be expressed with their integral-multiple displacements corrected with respect to the original spectrum given to the $1^{st}$ A-scan signal.

With the above calculation, if there is time lag between the sampling timings, it is principally possible to determine whether the displacement is by +1 pixel or by −1 pixel. However, since the depthwise position $z_{m1}$ of the correction light is close to the depthwise position $z_{max}$ of the Nyquist frequency, the positive/negative sign may not be determined if aliasing occurs in the phase shift amount expressed in Math 8 above due to the noise influence. Therefore, in step S14, the sign is not determined, and instead, the absolute value of the displaced amount is detected, and a determination on whether it is displaced by 1 pixel (i.e., by +1 pixel or −1 pixel) or a determination on whether the displaced amount is 0 is made. Accordingly, the absolute value of a relative sampling displaced amount of the $n^{th}$ A-scan signal relative to the $1^{st}$ A-scan signal is determined as shown in Math 14 below.

$$f_j^{abs}(n) = \begin{cases} 1 & \left(|\eta_j(z_{m1}, \Delta_{n,n+1})| \geq \frac{|\eta_{theory}(z_{m1})|}{2}\right) \\ 0 & \left(|\eta_j(z_{m1}, \Delta_{n,n+1})| < \frac{|\eta_{theory}(z_{m1})|}{2}\right) \end{cases} \quad \text{[Math 14]}$$

That is, with ½ of the phase shift amount of the A-scan signal at the position $zm_1$ expressed in Math 11 above as a threshold, the processor 202 determines that the absolute value of the integer shift in the spectrum data is 1 in a case where the phase shift amount between the measured $n^{th}$ A-scan signal and the $n+1^{th}$ A-scan signal at the position $zm_1$ indicated by Math 12 above is equal to or greater than this threshold, and determines that the absolute value of the integer shift in the spectrum data is 0 in a case where that phase shift amount is less than this threshold.

Next, the processor 202 detects the sign of the absolute value of the sampling displaced amount detected in step S14 (S16). The absolute value of the displaced amount determined by Math 14 above is a relative relationship between the $1^{st}$ A-scan signal and the $n^{th}$ A-scan signal in each of the signal processing units 84, 85, 94, 95, and it is not known whether a displacement is occurring among the four signal processing units 84, 85, 94, 95. To ascertain this point, signals of two correction light measured at different depthwise positions are used.

Step S16 is performed according to a procedure below. Firstly, depthwise positions of two correction light are set as $z_{m1}$, $z_{m2}$. It should be noted that $z_{max} > z_{m1} > z_{m2} > 0$ is assumed. The two correction light includes the light that has not passed through the glass block 404 and the light that has passed through the glass block 404 in the light guided to the measurement light path S4. As aforementioned, the two correction light may include the light that has passed through the glass block 404 once and the light that has passed through the glass block 404 twice.

Signals of the two correction light are shown by Math 15 and Math 16 below.

$$E_j'(z_{m1},n) = e^{i\vartheta_{m1}} E_j''(z_{m1},n) \quad \text{[Math 15]}$$

$$E_j'(z_{m2},n) = e^{i\vartheta_{m2}} E_j''(z_{m2},n) \quad \text{[Math 16]}$$

Here, a part of Math 15 above is shown by Math 17 below, and a part of Math 16 above is shown by Math 18 below.

$$\vartheta_{m1} \quad \text{[Math 17]}$$

$$\vartheta_{m2} \quad \text{[Math 18]}$$

Since the sampling displaced amount in the $j^{th}$ signal processing unit relative to the first signal processing unit is calculated in step S16, generality is not lost even if Math 17 and Math 18 are defined so that phases of the signals of the two correction light in the first signal processing unit become zero. Due to this, a definition is established as in Math 19 below.

$$\arg(E_1''(z_{m1},n)) = \arg(E_1''(z_{m2},n)) = 0 \quad \text{[Math 19]}$$

The processor 202 calculates a relative value between the positions $z_{m1}$, $z_{m2}$ of the two correction light, and further calculates relative values of the two correction light between the signal processing units 84, 85, 94, 95 as in Math 20 below.

$$g_j(n) = \frac{E_j'(z_{m1},n)}{E_j'(z_{m2},n)} \cdot \left(\frac{E_1'(z_{m1},n)}{E_1'(z_{m2},n)}\right)^{-1} = \frac{E_j''(z_{m1},n)}{E_j''(z_{m2},n)} \cdot \left(\frac{E_1''(z_{m1},n)}{E_1''(z_{m2},n)}\right)^{-1} \quad \text{[Math 20]}$$

Further, the processor 202 calculates an average value of the relative values calculated by Math 20 in accordance with the absolute value of the sampling displaced amount determined by using Math 14 in step S14. The average value of the relative values in a case where the absolute value of the sampling displaced amount is 0 is expressed by Math 21 below, and the average value of the relative values in a case where the absolute value of the sampling displaced amount is 1 is expressed by Math 22 below.

$$g_j^{abs0} = \frac{1}{m_j^{abs}} \sum_{n=1, f_j^{abs}(n)=0}^{n_{all}} g_j(n) \quad \text{[Math 21]}$$

$$g_j^{abs1} = \frac{1}{m_j^{abs1}} \sum_{n=1, f_j^{abs}(n)=1}^{n_{all}} g_j(n) \quad \text{[Math 22]}$$

By using parameters of Math 21 and Math 22 above, a determination on whether the sampling displaced amount between the first signal processing unit and the $j^{th}$ signal processing unit is 1 pixel, −1 pixel, or 0 pixel can be made.

The process of detecting the sampling displaced amount between the first signal processing unit and the $j^{th}$ signal processing unit will further be described with reference to FIGS. 6 to 9. Here, the sampling displaced amount in the $n^{th}$ A-scan signal sampled in the $j^{th}$ signal processing unit is expressed by Math 23 below.

$$\chi_j(n) \quad \text{[Math 23]}$$

Figure 6:
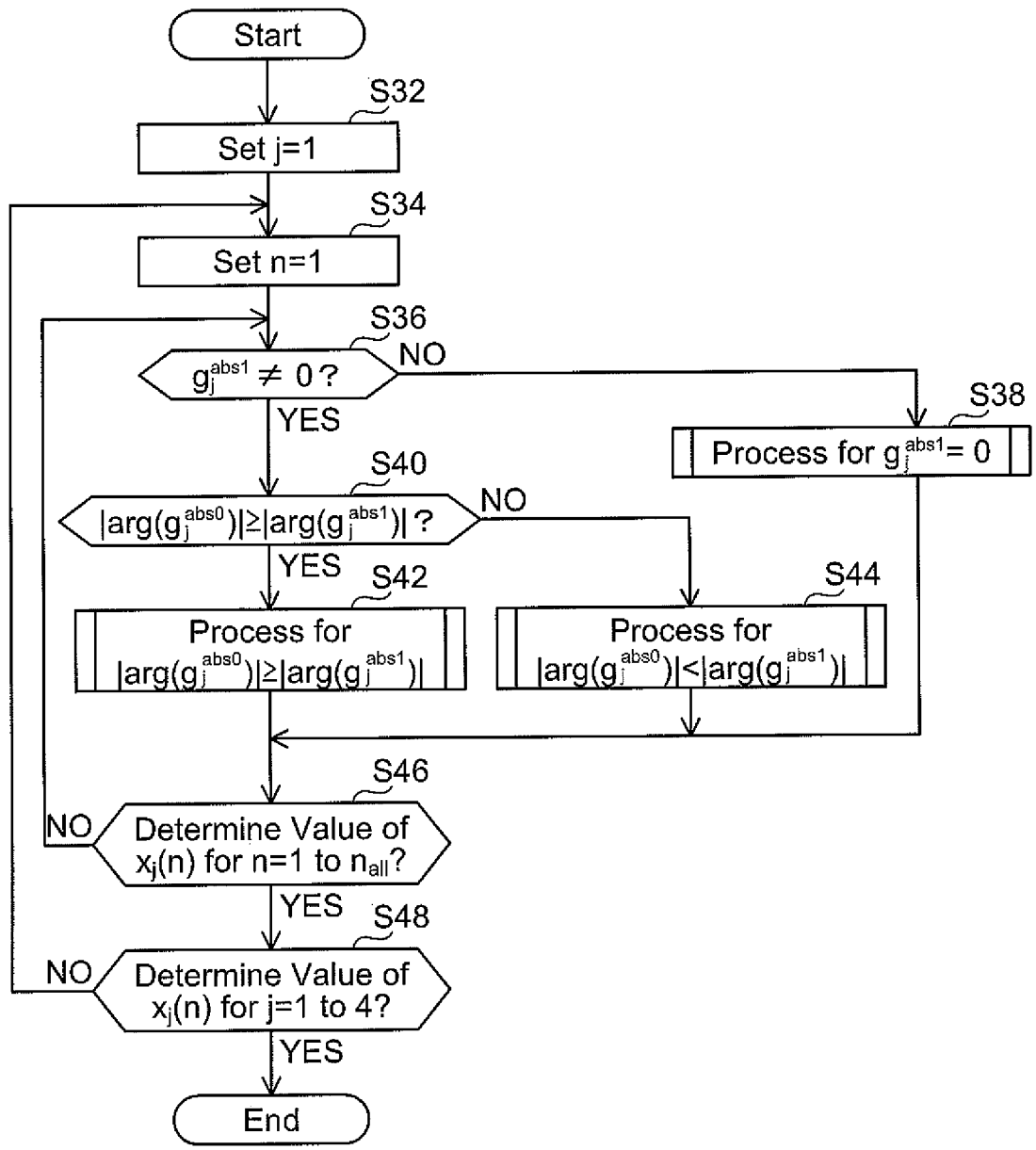
FIG. 6 is a flowchart showing an example of a process to detect a sampling displaced amount between a first signal processing unit and a $j^{th}$ signal processing unit.

FIG. 6 is a flowchart showing a method of detecting a value expressed by Math 23 (hereinbelow may simply be termed "sampling displaced amount").

As shown in FIG. 6, the processor 202 firstly sets j=1 to detect the $1^{st}$ A-scan signal in the first signal processing unit (S32), and then sets n=1 (S34).

Next, the processor 202 determines whether the average value of the relative values of the sampling displaced amount expressed by Math 22 above is 0 or not (S36). In a case where the value expressed by Math 22 is 0 (in case of NO in step S36), the processor 202 proceeds to step S38. In a case where the value expressed by Math 22 is not 0 (in case of YES in step S36), the processor 202 proceeds to S40.

Figure 7:
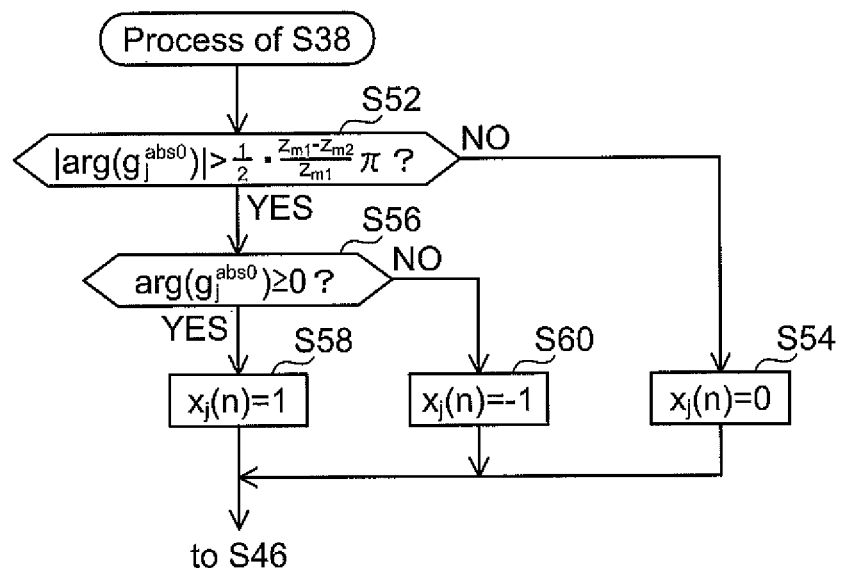
FIG. 7 is a flowchart showing details of a process of step S38 of FIG. 6.

Here, a process of step S38 for the case where the value expressed by Math 22 is 0 (in case of NO in step S36) will be described with reference to FIG. 7. In step S38, since the value expressed by Math 22 is 0, Math 21 is applied instead of Math 22. As shown in FIG. 7, the processor 202 firstly determines whether or not the absolute value of the phase component of Math 21 is greater than a threshold (S52). The threshold herein is ½ of the phase shift amount of the A-scan signal between the positions $z_{m1}$, $z_{m2}$. In a case where the absolute value of the phase component of Math 21 is equal to or less than the threshold (in case of NO In step S52), the sampling displaced amount is determined as 0 (S54). On the other hand, in a case where the absolute value of the phase component of Math 21 is greater than the threshold (in case of YES in step S52), the absolute value of the sampling displaced amount is determined as 1.

When the absolute value of the sampling displaced amount is determined as 1 (in case of YES in step S52), the processor 202 determines whether or not the phase component of Math 21 is equal to or greater than 0 (S56). In a case where the phase component of Math 21 is equal to or greater than 0 (in case of YES in step S56), the sampling displaced amount is determined as 1 (S58). On the other hand, in a case where the phase component of Math 21 is less than 0 (in case of NO in step S56), the sampling displaced amount is determined as −1 (S60). The processor 202 proceeds to step S46 of FIG. 6 when the sampling displaced amount is determined by any of steps S54 to S60.

On the other hand, in the case where the value expressed by Math 22 is not 0 (in case of YES in step S36), the processor 202 determines whether or not the absolute value of the phase component of Math 21 is equal to or greater than the absolute value of the phase component of Math 22 (S40). In the case where the value expressed by Math 22 is not 0, a determination on which one of Math 21 and Math 22 is to be applied cannot be made. Thus, the absolute value of the phase component of Math 21 and the absolute value of the phase component of Math 22 are compared with each other, and Math 21 is applied in a case where the absolute value of the phase component of Math 21 is equal to or greater than the absolute value of the phase component of Math 22, while Math 22 is applied in a case where the absolute value of the phase component of Math 21 is less than the absolute value of the phase component of Math 22. The processor 202 proceeds to step S42 in the case where the absolute value of the phase component of Math 21 is equal to or greater than the absolute value of the phase component of Math 22 (in case of YES in step S40), and proceeds to step S44 in the case where the absolute value of the phase component of Math 21 is less than the absolute value of the phase component of Math 22 (in case of NO in step S40).

Figure 8:
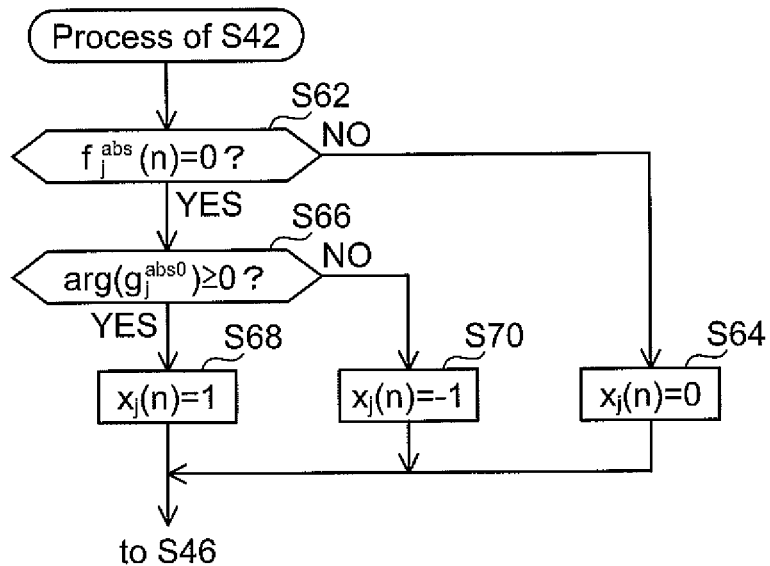
FIG. 8 is a flowchart showing details of a process of step S42 of FIG. 6.

Here, the process of step S42 for the case where the absolute value of the phase component of Math 21 is equal to or greater than the absolute value of the phase component of Math 22 (in case of YES in step S40) will be described with reference to FIG. 8. As shown in FIG. 8, the processor 202 firstly determines whether the absolute value of the sampling displaced amount determined by Math 14 is 0 or not (562). By using Math 14, a determination on whether the absolute value of the sampling displaced amount is 1 (that is, +1 or −1) or 0 can be made. In a case where the absolute value of the sampling displaced amount is not 0 (in case of NO in step S62), the sampling displaced amount is determined as 0 (S64). On the other hand, in a case where the absolute value of the sampling displaced amount is 0 (in case of YES in step S62), the absolute value of the sampling displaced amount is determined as 1.

When the absolute value of the sampling displaced amount is determined as 1 (in case of YES in step S62), the processor 202 determines whether or not the phase component of Math 21 is equal to or greater than 0 (S66). In a case where the phase component of Math 21 is equal to or greater than 0 (in case of YES in step S66), the sampling displaced amount is determined as 1 (S68). On the other hand, in a case where the phase component of Math 21 is less than 0 (in case of NO in step S66), the sampling displaced amount is determined as −1 (S70). The processor 202 proceeds to step S46 of FIG. 6 when the sampling displaced amount is determined by any of steps S64 to S70.

Figure 9:
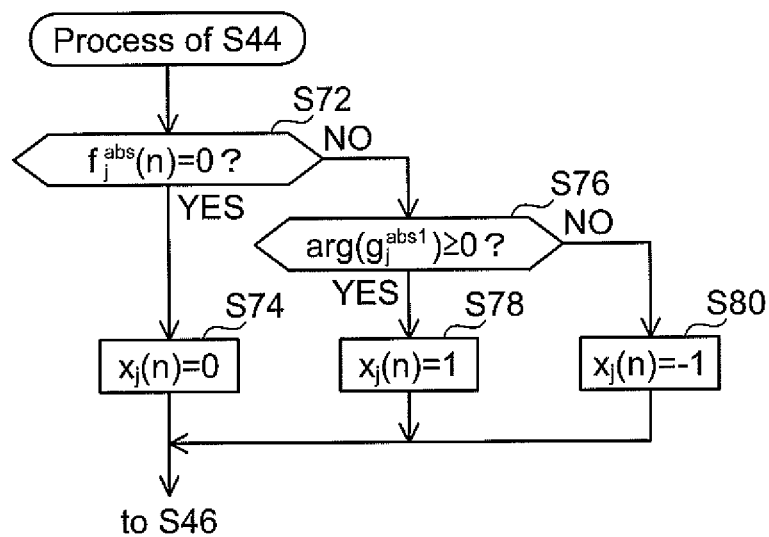
FIG. 9 is a flowchart showing details of a process of step S44 of FIG. 6.

Further, a process of step S44 for the case where the absolute value of the phase component of Math 21 is less than the absolute value of the phase component of Math 22 will be described with reference to FIG. 9. As shown in FIG. 9, the processor 202 firstly determines whether the absolute value of the sampling displaced amount determined by Math 14 is 0 or not (S72). In a case where the absolute value of the sampling displaced amount is 0 (in case of YES in step S72), the sampling displaced amount is determined as 0 (S74). On the other hand, in a case where the absolute value of the sampling displaced amount is not 0 (in case of NO in step S72), the absolute value of the sampling displaced amount is determined as 1. In step S62 (see FIG. 8) above, the sampling displaced amount is determined as 0 in the case where the absolute value of the sampling displaced amount determined by Math 14 is not 0, and the sampling displaced amount is determined as 1 in the case where the absolute value of the sampling displaced amount is 0. That is, process branching of step S62 is opposite to that of step S72. This is because a determination on whether the meaning of the absolute value of the sampling displaced amount determined by Math 14 is inversed or not was made in step S40 (see FIG. 6), which branches into step S62 (that is, step S42) and step S72 (that is, step S44).

When the absolute value of the sampling displaced amount is determined as 1 (in case of NO in step S72), the processor 202 determines whether or not the phase component of Math 22 is equal to or greater than 0 (S76). In a case where the phase component of Math 22 is equal to or greater than 0 (in case of YES in step S76), the sampling displaced amount is determined as 1 (S78). On the other hand, in a case where the phase component of Math 22 is less than 0 (in case of NO in step S76), the sampling displaced amount is determined as −1 (S80). The processor 202 proceeds to step S46 of FIG. 6 when the sampling displaced amount is determined by any of steps S74 to S80.

When the process of step S38, step S42, or step S44 is completed, the processor 202 determines whether or not the sampling displaced amount has been determined (that is, whether or not the processes of steps S54 to S60, steps S64 to S70, or steps S74 to S80 have been performed) for each one of the A-scan signals (n=1 to $n_{all}$) (S46). In a case where the sampling displaced amount has not yet been determined for all of the A-scan signals (in case of NO in step S46), the processor 202 returns to step S36 and repeats the processes of steps S36 to S44. Then, when the sampling displaced amounts have been determined for all of the A-scan signals (in case of YES in step S46), the processor 202 determines whether or not the sampling displaced amount has been determined for each one of the signal processing units (j=1 to 4) (S48). In a case where the sampling displaced amount has not yet been determined for all of the signal processing units (in case of NO in step S48), the processor 202 returns to step S34 and repeats the processes of steps S34 to S46. Then, when the sampling displaced amounts have been determined for all of the signal processing units (in case of YES in step S48), the detection of the sampling displaced amounts is completed.

By performing the processes shown in FIGS. 6 to 9, the sampling displaced amounts in all of the $1^{st}$ to $n_{all}^{th}$ A-scan signals sampled in the respective signal processing units 84, 85, 94, 95 can be calculated. By using them, the signals sampled respectively in the signal processing units 84, 85, 94, 95 are connected as in Math 24 below.

$$E_j''(z, n) = E_j'(z, n) \cdot \exp\left(-\frac{z}{z_{max}} \pi \cdot \chi_j(n)\right) \quad \text{[Math 24]}$$

Next, returning to FIG. 5, the processor 202 corrects the phase drifts generated in data sampled in the respective signal processing units 84, 85, 94, 95 (S18). As aforementioned, different phase drifts are generated in the data sampled in the respective signal processing units 84, 85, 94, 95. In step S18, these phase drifts are corrected. Here, the signal of the correction light at the depthwise position $z_{m1}$ is expressed in Math 25 below.

$$E_j''^*(z_{m1}, n) \quad \text{[Math 25]}$$

Further, the processor 202 uses Math 26 below to correct the phase drifts generated in data sampled in the respective signal processing units 84, 85, 94, 95.

$$E_j'''(z, n) = E_j''(z, n) \cdot \frac{E_j''^*(z_{m1}, n)}{|E_j''(z_{m1}, n)|} \quad \text{[Math 26]}$$

Next, the processor 202 corrects a shift corresponding to a sub-pixel which is generated in an individual optical coherence tomographic device (S20). As aforementioned, the signals sampled in the signal processing units 84, 85, 94, 95 include errors (displacements) caused by the time lag between the sampling timings. These displaced amounts are dependent on the configuration of the individual optical coherence tomographic device, so the displaced amounts are constant within the same device. Step S20 corrects displacements generated as above.

In step S20, the correction is performed by using signals from a plurality of mirrors which are not shown (that is, mirrors different from the mirror 403). The plurality of mirrors is arranged within a range where the depthwise positions are from z=0 to z=$z_{max}$. Here, it is assumed that the mirrors are arranged respectively at $1_{all}$ positions along the depth direction. Then, in regard to the mirror that is arranged at the $1^{st}$ position in the depth direction, a relative phase between the first signal processing unit and the $j^{th}$ signal processing unit is expressed by Math 27 below.

$$\varphi_j(l) \quad \text{[Math 27]}$$

A value expressed by Math 27 can be calculated by using Math 28 below.

$$\varphi_j(l) = arg\left\{\frac{1}{n_{all}} \sum_{n=1}^{n_{all}} \exp\left[i \cdot arg\left(\frac{E_j'''(z_{spsl})}{E_1'''(z_{spsl}, n)}\right)\right]\right\} \quad \text{[Math 28]}$$

Further, a relationship of the relative phase between the first signal processing unit and the $j^{th}$ signal processing unit with a relative phase where l=1, which is the closest position to z=0, is calculated as in Math 29 below.

$$\varphi_j'(l)=arg\ \{\exp[i(\varphi_j(l)-\varphi_j(1))]\} \quad \text{[Math 29]}$$

The processor 202 uses Math 29 above to calculate values corresponding to all of 1s from l=1 to l=$1_{all}$, and calculates an inclination $a_j$ from z by linear fitting. Then, the processor 202 applies the same to Math 30 below, and corrects the sub-pixel shift generated depending on the device.

$$E_j''''(z,n)=E_j'''(z,n)\cdot\exp(-ia_j z) \quad \text{[Math 30]}$$

Next, reconstruction of a Jones matrix is performed (S22). By steps S12 to S20, all the signal phases in the depth direction sampled in the four signal processing units 84, 85, 94, 95 are expressed as relative values relative to the phases of the signals of the correction light at the depthwise position $z_{m1}$. Further, in the optical coherence tomographic device of the present embodiment, respective elements of the Jones matrix are obtained by the four signal processing units 84, 85, 94, 95. In this case, the Jones matrix is inherently a unitary matrix, however, the operations of steps S12 to S20 do not make it be a unitary matrix. Here, a relationship between the signals sampled in the signal processing units 84, 85, 94, 95 and the Jones matrix is assumed to be defined as in Math 31 below.

$$J(z, n) = \begin{bmatrix} E_1'''(z, n) & E_3'''(z, n) \\ E_2'''(z, n) & E_4'''(z, n) \end{bmatrix} \quad \text{[Math 31]}$$

In this case, the processor 202 reconstructs the Jones matrix as in Math 32 below in order to make the equation of Math 31 into a unitary matrix.

$$J'(z, n) = \begin{bmatrix} E_1'''(z, n) & -E_3'''(z, n) \\ E_2'''(z, n) & E_4'''(z, n) \end{bmatrix} \quad \text{[Math 32]}$$

According to the above, the synchronized correction for the sampling timings of the signal processing units 84, 85, 94, 95 is completed, and the Jones matrix is reconstructed. When the Jones matrix is reconstructed, polarization characteristics of the subject 500 can be calculated by using the reconstructed Jones matrix, and a tomographic image of the subject 500 can thereby be generated.

In an experiment conducted by the inventor, it has been confirmed that time lag in synchronization between the sampling timings of the signal processing units 84, 85, 94, 95 can be corrected in the above optical coherence tomographic device. In the experiment, a wavelength plate with a known phase delay amount was used. Specifically, a wavelength plate having a round-trip phase delay amount of 1.35 radian was used. This wavelength plate was rotated by 10 degrees increment between 0 to 180 degrees to measure the Jones matrix of the wavelength plate. Further, eigenvalue decomposition was performed to the measured Jones matrix to calculate the phase delay amount and a birefringence axis of the wavelength plate.

Figure 10:
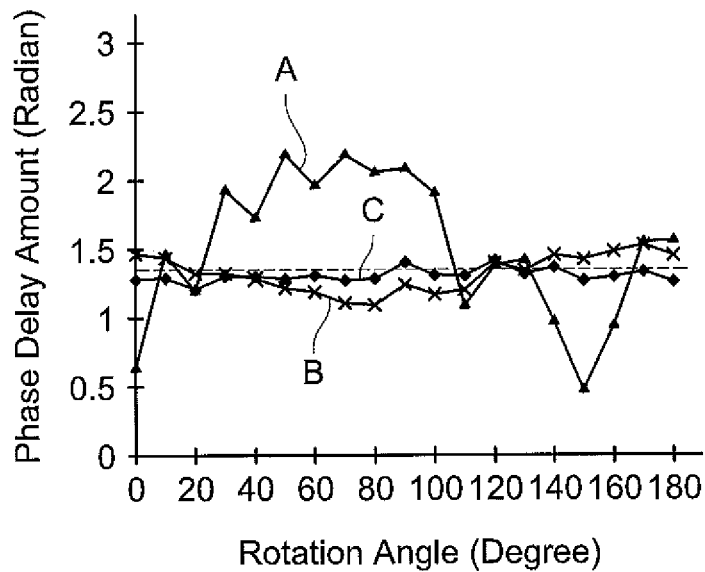
FIG. 10 shows a relationship between a rotation angle and a phase delay amount of a wavelength plate when time lag between the sampling timings in the plurality of signal processing units is corrected.

FIG. 10 shows a relationship between the rotation angle (horizontal axis) and the phase delay amount (vertical axis) of the wavelength plate. Further, a graph A corresponds to a case where the processes of steps S12 and S14 are performed (more specifically, the equations from Math 1 to Math 13 are applied) but the processes of steps S16 to S20 are not performed. A graph B corresponds to a case where the processes of steps S12 to S18 are performed but the process of step S20 is not performed. A graph C corresponds to a case where the processes of steps S12 to S20 (that is, all of the processes) are performed. A broken line indicates a theoretical value.

As shown in FIG. 10, the phase delay amount changes depending on the rotation angle of the wavelength plate in the graph A, so a correct phase delay amount could not be obtained. That is, the time lag in synchronization couldn't be corrected. On the other hand, the change in the phase delay amount according to the rotation angle of the wavelength plate is small in graph B, and the phase delay amount is closer to the theoretical value (the broken line). That is, it has been found that the time lag in synchronization was mostly corrected in the case of the graph B. Further, hardly any change in the phase delay amount according to the rotation angle of the wavelength plate can be seen in the graph C, and the phase delay amount is substantially identical to the theoretical value. That is, it has been found that the time lag in synchronization can be corrected in the case of the graph C. Thus, it has been confirmed that the time lag in synchronization can be corrected by performing the correction process using the correction light as aforementioned.

Figure 11:
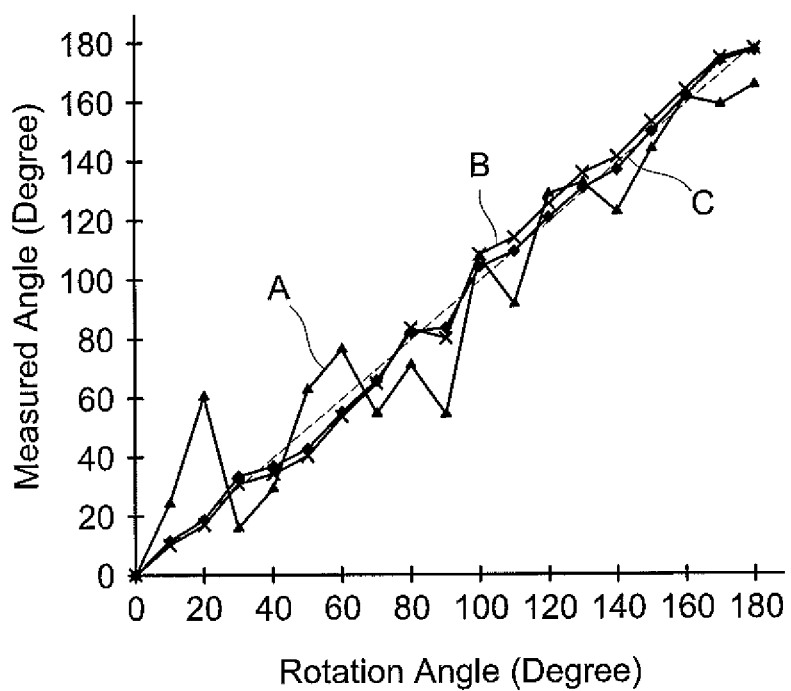
FIG. 11 shows a relationship between the rotation angle of the wavelength plate and a measured angle of the wavelength plate when time lag between the sampling timings in the plurality of signal processing units is corrected.

Further, FIG. 11 shows a relationship between the set rotation angle (horizontal axis) of the wavelength plate and the measured angle (vertical axis) of the wavelength plate. Graphs A to C and a broken line are same as those in FIG. 10, so detailed descriptions thereof will be omitted. In FIG. 11 as well, similar results to those of FIG. 10 were confirmed. That is, as shown in FIG. 11, a result close to the theoretical value could not be obtained in the case of the graph A. On the other hand, a result closer to the theoretical value was obtained in the case of the graph B. Further, a result closer to the theoretical value than that of the graph B was obtained in the case of the graph C. According to these results, it has been confirmed that the time lag in synchronization can be corrected by performing the correction process using the correction light as aforementioned.

The optical coherence tomographic device of the present embodiment splits the measurement light to configure the measurement light path S4 and arranges the mirror 403 and the glass block 404 on the measurement light path S4, however, no limitation is placed to this configuration. The optical coherence tomographic device simply needs to be configured so that the measurement light includes two or more correction light. For example, the optical coherence tomographic device may be configured so that the measurement light is split to configure even a larger number of measurement light paths and the two or more correction light are generated by different measurement light paths.

Specific examples of the disclosure herein have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed.

What is claimed is:

1. An optical coherence tomographic device comprising:
   a light source;
   a measurement light generator configured to generate measurement light by using light from the light source, and generate reflected light from a subject by irradiating the subject with the generated measurement light;
   a reference light generator configured to generate reference light by using the light from the light source;
   an interference light generator configured to generate interference light by combining the reflected light from the subject generated by the measurement light generator and the reference light generated by the reference light generator;
   an interference light detector configured to detect interference signals from the interference light generated by the interference light generator;
   a processor; and
   a memory storing computer-readable instructions,
   wherein the interference light detector comprises:
      a first detector and a second detector configured to convert the interference light to the interference signals;
      a first signal processing unit configured to sample the interference signal outputted from the first detector; and
      a second signal processing unit configured to sample the interference signal outputted from the second detector,
   wherein each of the first and second signal processing units is configured to sample the interference signal at a timing that is inputted to the signal processing unit from outside,
   wherein the reflected light generated by the measurement light generator at least includes first correction light having a first optical path length and second correction light having a second optical path length that is different from the first optical path length, wherein the computer-readable instructions, when executed by the processor, cause the processor to:
generate a tomographic image by using the interference signals sampled respectively by the first and second signal processing units; and
correct a time lag in synchronization between sampling timings of the first and second signal processing units by using a first correction signal converted from the first correction light and a second correction signal converted from the second correction light, the first and second correction signals being included in the interference signals sampled respectively in the first and second signal processing units, wherein the measurement light generator comprises:
a splitter configured to split an optical path of the light from the light source into a correction light and the measurement light;
an optical path length adjuster disposed on a first optical path split by the splitter,
wherein the measurement light is generated by the light from the light source on a second optical path split by the splitter, and
wherein the correction light comprises the first correction light and the second correction light, both being generated by light from the light source on the first optical path, and
wherein at least one of the first optical path length of the first correction light and the second optical path length of the second correction light is adjusted by the optical path length adjuster,
the optical path length adjuster comprises a glass block that is disposed on the first optical path split by the splitter, the glass block being configured to allow a part of the measurement light to pass through, and
the measurement light generator is configured to generate the first correction light by using light that passes through the glass block, and generate the second correction light by using light that does not pass through the glass block.

2. An optical coherence tomographic device comprising:
a light source;
a measurement light generator configured to generate measurement light by using light from the light source, and generate reflected light from a subject by irradiating the subject with the generated measurement light;
a reference light generator configured to generate reference light by using the light from the light source;
an interference light generator configured to generate interference light by combining the reflected light from the subject generated by the measurement light generator and the reference light generated by the reference light generator;
an interference light detector configured to detect interference signals from the interference light generated by the interference light generator;
a processor; and
a memory storing computer-readable instructions, wherein the interference light detector comprises:
a first detector and a second detector configured to convert the interference light to the interference signals;
a first signal processing unit configured to sample the interference signal outputted from the first detector; and
a second signal processing unit configured to sample the interference signal outputted from the second detector,
wherein each of the first and second signal processing units is configured to sample the interference signal at a timing that is inputted to the signal processing unit from outside,
wherein the reflected light generated by the measurement light generator at least includes first correction light having a first optical path length and second correction light having a second optical path length that is different from the first optical path length,
wherein the computer-readable instructions, when executed by the processor, cause the processor to:
generate a tomographic image by using the interference signals sampled respectively by the first and second signal processing units; and
correct a time lag in synchronization between sampling timings of the first and second signal processing units by using a first correction signal converted from the first correction light and a second correction signal converted from the second correction light, the first and second correction signals being included in the interference signals sampled respectively in the first and second signal processing units,
wherein the measurement light generator comprises:
a splitter configured to split an optical path of the light from the light source into a correction light and the measurement light; and
an optical path length adjuster disposed on a first optical path split by the splitter,
wherein the measurement light is generated by the light from the light source on a second optical path split by the splitter,
wherein the correction light comprises the first correction light and the second correction light, both being generated by light from the light source on the first optical path, and
wherein at least one of the first optical path length of the first correction light and the second optical path length of the second correction light is adjusted by the optical path length adjuster,
the optical path length adjuster comprises a
glass block that is disposed on the first optical path split by the splitter, the glass block being configured to allow a part of the measurement light to pass through, and
the measurement light generator is configured to generate the first correction light by using light that passes through the glass block for a first number of times, and generate the second correction light by using light that passes through the glass block for a second number of times which is different from the first number of times.

* * * * *